K. SCHMIDT.
CHEMICAL FIRE EXTINGUISHER.
APPLICATION FILED NOV. 22, 1913. RENEWED NOV. 14, 1919.
1,342,768.
Patented June 8, 1920.
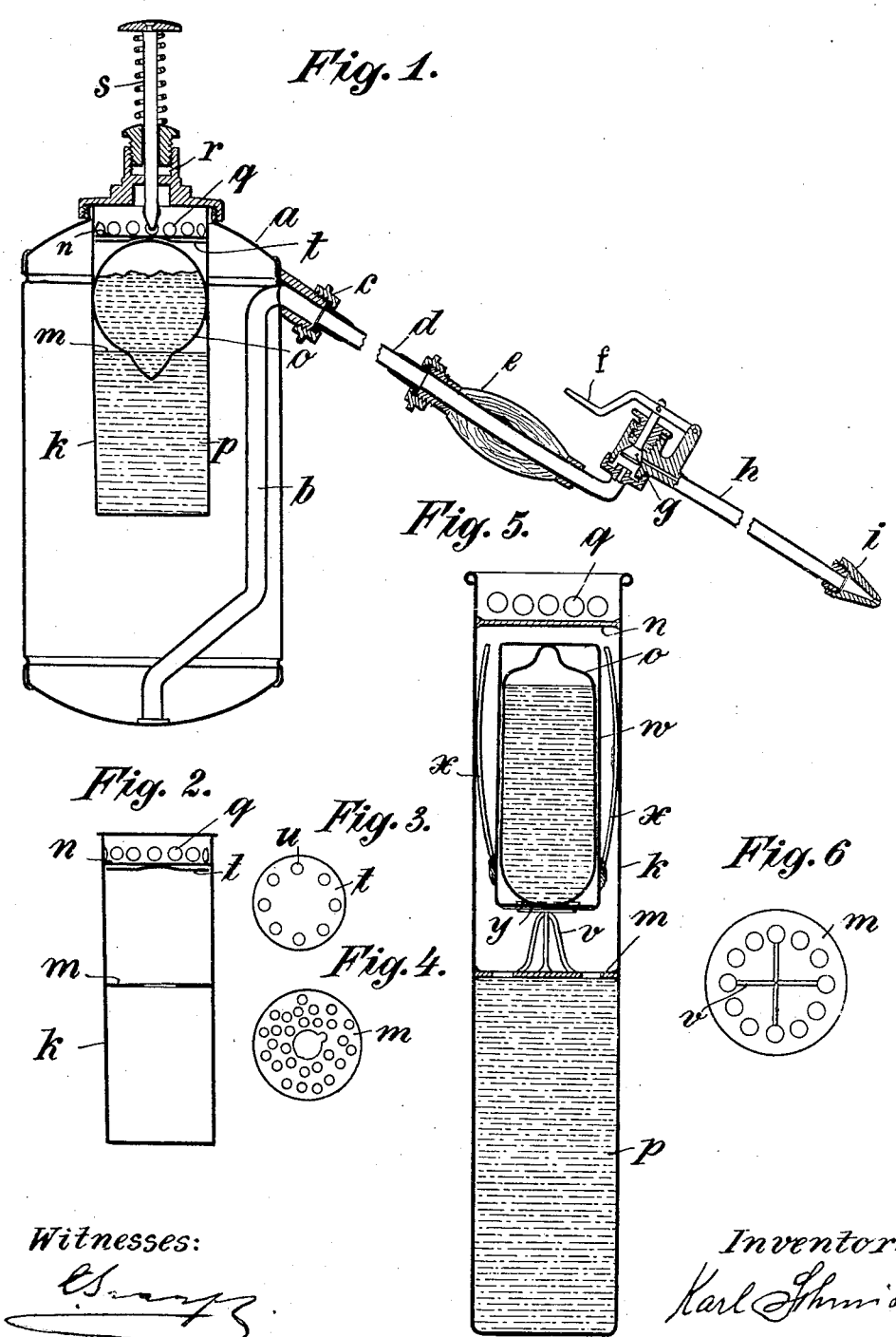

UNITED STATES PATENT OFFICE.

KARL SCHMIDT, OF NEURUPPIN, GERMANY, ASSIGNOR, BY MESNE ASSIGNMENTS, TO THE CHEMICAL FOUNDATION, INC., A CORPORATION OF DELAWARE.

CHEMICAL FIRE-EXTINGUISHER.

1,342,768.   Specification of Letters Patent.   Patented June 8, 1920.

Application filed November 22, 1913, Serial No. 802,513. Renewed November 14, 1919. Serial No. 338,115.

*To all whom it may concern:*

Be it known that I, KARL SCHMIDT, a subject of the German Emperor, residing at Neuruppin, Mark, Prussia, German Empire, have invented certain new and useful Improvements in Chemical Fire - Extinguishers, of which the following is a specification.

The present invention relates to a chemical fire-extinguisher, in which the operating pressure is produced only at the moment the extinguisher is to be used, but independently of the extinguishing fluid, so that any extinguishing fluid may be used, and also such, which, hitherto could be used in chemical extinguishers with difficulty only or not at all, as the chemical substances employed for the production of the gases formed compounds with the extinguishing fluid or could not be mixed therewith. The gas is produced in the extinguisher forming the subject of the present invention in the following manner: The chemicals for the production of the gas are arranged in separate chambers of an inset vessel, within which these chemicals are made to react on each other after the separating partitions have been pierced or otherwise opened, whereupon the gases produced escape through one or a plurality of apertures from the inset vessel and enter the vessel containing the extinguishing fluid, where they exert a pressure on the level of the latter so that it is forced out through a suitable conduit or jet-pipe.

In the said inset vessel for instance an alkali carbonate or an alkali bicarbonate and an acid, or peroxid of sodium and water, or other chemicals which react on each other with generation of gas may be made to react.

In the accompanying drawings the present invention is exemplified in two constructional forms. Figure 1 is a section through a fire extinguisher. Fig. 2 is a separate view of the inset vessel. Figs. 3 and 4 show the shape of two plates arranged in the inset vessel. Fig. 5 is another constructional form of the inset vessel and Fig. 6 is a plan of the closure plate in this vessel.

In the drawing $a$ is a fire extinguisher of any suitable shape and having an outlet pipe $b$, the extinguisher being filled with any suitable extinguishing liquid, for instance carbon tetrachlorid. The outlet pipe $b$ may be connected to a rigid or a flexible tube $d$ by means of a cap nut $c$, particularly when the extinguisher is to be used on board of aerial craft; to the said tube or its extension is fitted a handle $e$. Above or close to this handle is arranged the operating lever $f$ of a valve $g$ to the body of which a tube $h$ with a jet-nozzle $i$ is connected.

In the vessel $a$, preferably in its filling opening is placed a removable inset vessel $k$, which is divided by a perforated plate $m$ into two chambers. In the one of these chambers is placed a substance suitable for producing gas. This substance $p$ may be, for instance an alkali carbonate with an addition of a little water. The other chamber contains a glass vessel $o$ of acid or some other suitable chemical. Above the vessel $o$ is placed a plate $t$ having perforations $u$, and over this plate a second plate $n$, which tightly closes the vessel $k$ and is easily pierced, being made for example of lead. Above the plate $n$ the wall of the vessel $k$ has perforations $q$. The filling opening of the extinguisher may be closed by means of a screw cap $r$ through which a bolt $s$ under action of a spring passes with a tight joint. The operation of the arrangement described is as follows: When the bolt $s$, the free end of which is somewhat enlarged and pointed, is driven inward it pierces the plate $n$ and the blow is transmitted by the plate $t$ to the vessel $o$, so that the latter, which abuts against the plate $m$ is broken. The contents of the vessel $o$ passes through the perforations in the plate $m$ into the chamber, which in Fig. 1 is the lower one of the vessel $k$, and reacts with the chemical $p$ producing a gas. This gas passes through the perforations in plate $m$ into the upper chamber of the vessel $k$ and escapes through the opening in the plate $n$ cleared by the bolt $s$ which has in the meantime receded, and passes through the openings $q$ in the wall of the vessel $k$ into the vessel $a$ containing the extinguishing liquid, so that this liquid is placed under pressure and is driven out through the tube $b$.

In the constructional form of the inset vessel $k$ according to Figs. 5 and 6 the cylindrical vessel $o$ is surrounded by a metallic casing $w$ which has at its lower end an opening closed by a plate of lead or the like and is stayed by resilient arms $x$ against the walls of the vessel $k$. The casing $w$ rests with the plate $y$ on the point of a spider $v$ or the like arranged on the partition in the vessel $k$. The vessel $o$ may be opened by a percussion bolt which penetrates the plate $n$ made of lead, glass or the like, and then strikes against the top of the casing $w$ and forces the latter downward, as shown in Fig. 5, so that the spider $v$ may pierce the plate $y$ and destroy the vessel $o$, so that its contents can run out and pass through the perforations in plate $m$ into the lower chamber of the vessel $k$. The spider $v$ is preferably a wire spider which may pierce a hole into plate $y$ of such size, that after the spider has entered into the casing $w$ the contents of the vessel may flow out.

Claims:

1. In a chemical fire extinguisher in combination with the vessel containing the extinguishing liquid, an inset vessel having gas escape openings near its one end, a perforated plate in said inset vessel dividing it into two chambers, said chambers containing chemicals adapted to react on each other and produce a gas, a readily broken plate closing tightly the said inset vessel and being arranged below said gas escape openings, and a bolt operable from outside, adapted to break through said readily broken plate.

2. In a chemical fire extinguisher in combination with the vessel containing the extinguishing liquid, an inset vessel having gas escape openings near its one end, a perforated plate in said inset vessel dividing it into two chambers, said chambers containing chemicals adapted to react on each other and produce a gas, a cartridge containing one of the chemicals and being slidably arranged in one of said chambers, a readily broken plate closing tightly the said inset vessel and being arranged below said gas escape openings, and a bolt operable from outside, adapted to break through said readily broken plate.

3. A chemical fire extinguisher comprising a vessel containing the extinguishing liquid, an inset vessel therein, the said inset vessel divided into two chambers by means of a perforated plate, said chambers containing chemicals adapted to react on each other and produce a gas, a cartridge containing one of the chemicals and being slidably arranged in one of said chambers, resilient arms bracing said cartridge against the walls of the inset vessel, an easily broken plate closing said cartridge, a spider arranged on the partition between the said two chambers, a readily broken plate closing tightly the said inset vessel, and means for forcing the said cartridge from outside against said spider.

4. In a chemical fire extinguisher the combination of a vessel containing the extinguishing liquid with an inset vessel having a flange in order to be able to be fixed in the filling opening of the vessel containing the extinguishing liquid and having gas escape openings near its one end, a perforated plate in said inset vessel dividing it into two chambers, said chambers containing chemicals adapted to react on each other and produce a gas, a cartridge slidably arranged in one of said chambers, a glass vessel arranged in said cartridge and containing one of the chemicals, resilient arms bracing said cartridge against the walls of the inset vessel, an easily broken plate closing said cartridge, a spider arranged on the partition between the said two chambers, a readily broken plate closing tightly the said inset vessel and being arranged below its gas escape openings, means for opening from outside the inset vessel and forcing the said cartridge against said spider, a movable tube attached to the discharge of the main liquid vessel, a jet nozzle connected to said movable tube, and a valve controlling said jet nozzle and being operated by a finger-lever, substantially as described and for the purpose specified.

In testimony whereof I affix my signature in presence of two witnesses.

KARL SCHMIDT.

Witnesses:
WOLDEMAR HAUPT,
HENRY HASPER.